(12) United States Patent
Yang et al.

(10) Patent No.: US 6,304,678 B1
(45) Date of Patent: Oct. 16, 2001

(54) IMAGE ARTIFACT REDUCTION USING MAXIMUM LIKELIHOOD PARAMETER ESTIMATION

(75) Inventors: Seungjoon Yang, Madison; Yu Hen Hu, Middleton, both of WI (US); Truong Q. Nguyen, Burlington, MA (US); Damon L. Tull, Madison, WI (US)

(73) Assignee: The Trustees of Boston University, Boston, MA (US)

( * ) Notice: Subject to any disclaimer, the term of this patent is extended or adjusted under 35 U.S.C. 154(b) by 0 days.

(21) Appl. No.: 09/569,462

(22) Filed: May 12, 2000

Related U.S. Application Data (60) Provisional application No. 60/134,155, filed on May 14, 1999.

(51) Int. Cl.[7] .............................. G06K 9/40; G06K 9/46; G06K 9/56; G06T 5/00; G06T 5/20
(52) U.S. Cl. ........................ 382/268; 382/275; 382/205
(58) Field of Search ..................................... 382/268, 275, 382/205, 195, 225, 228, 260, 262, 264; 358/463, 433

(56) References Cited

PUBLICATIONS

Fan, Zhigang et al., "Reducing Artifacts in JPEG Decompression by Segmentation and Smoothing", Proceedings of the International Conference on Image Processing, IEEE 1996, p. 17–20, vol. 2 of 3, expecially section 2.

Yang, Seungjoon et al., "Blocking Effect Removal Using Robust Statistics and Line Processing", 1999 IEEE Third Workshop on Multimedia Signal Process, IEEE, 1999, p. 315–320, especially Introduction.

*Primary Examiner*—Scott Rogers
(74) *Attorney, Agent, or Firm*—Weingarten, Schurgin, Gagnebin & Hayes LLP (57) ABSTRACT

A technique for post-processing decoded compressed images to reduce decoding-related artifacts employs a maximum likelihood estimation of an original image f. The decoded image is modeled as a montage of "flat surfaces" of different intensities, where the number of flat surfaces and their intensities are generally different in different regions of the decoded image. The intensity of each pixel is conditionally adjusted to that of a corresponding flat surface in a window region surrounding the pixel. In a general algorithm, the flat surface model is fitted to the observed image by estimating the model parameters using the "k-means" algorithm and a hierarchical clustering algorithm. A cluster similarity measure (CSM) is used to determine the number of intensity clusters, and hence flat surfaces, in the model of a window region surrounding a pixel of interest. The pixel intensity is adjusted to an estimated value which is the mean intensity of the cluster in which the pixel falls. A simplified version of the method employs a three-cluster model in which the cluster centers are initialized by a deterministic rule. This simplified method is non-iterative in nature, thus requiring fewer computational resources.

47 Claims, 10 Drawing Sheets

IMAGE ARTIFACT REDUCTION USING MAXIMUM LIKELIHOOD PARAMETER ESTIMATION

CROSS REFERENCE TO RELATED APPLICATIONS

This application claims priority under 35 U.S.C. §119(e) of provisional patent application No. 60/134,155, filed May 14, 1999, entitled "Image Ringing Artifact Reduction Using Non-Linear Robust Filtering".

STATEMENT REGARDING FEDERALLY SPONSORED RESEARCH OR DEVELOPMENT

This invention was made with Federal Government support under Contract No. 9896124 by the National Science Foundation. The Federal Government has certain rights in this invention.

BACKGROUND OF THE INVENTION

The present invention is related to the field of image processing, and more particularly to techniques for post-processing of decoded images to remove undesirable artifacts such as ringing and blocking.

Image compression is useful for efficient electronic storage of images as well as efficient transmission of images over a communications medium, such as the Internet. Many image compression techniques are in use today. The generalized image compression scheme employs a cascade of functional elements. For example, a transform may be applied to the original image to convert the image information to a more convenient domain, such as the frequency domain. The transformed image information is quantized to discrete levels that can be represented by a finite digital word, and the quantized result is compressed according to a compression coding algorithm. At the receiver, these functions are performed in reverse order to recover a facsimile of the original image.

Many compression techniques introduce certain types of noise, referred to as "artifacts", into the image. For example, an algorithm known as Joint Picture Expert Group (JPEG) encoding tends to introduce blocking artifacts at medium and low bit-rates. Blocking artifacts appear as subtle rectangular segmentation in the decoded image. In the JPEG algorithm, blocking arises from the use of short and non-overlapping basis functions.

Blocking can be reduced or eliminated using other transforms, such as wavelet transforms, that have overlapping basis functions. However, these may introduce spurious oscillations in the vicinity of major edges at low bit-rates. Such coding artifacts are called ringing artifacts. In a wavelet encoding scheme, ringing artifacts are caused by the abrupt truncation of the high frequency wavelet coefficients. It is desirable to obtain an image that is as free of compression-related artifacts as possible, thus improving image quality at low bit rates.

An artifact-free image can be estimated from the compressed image by maximum a posteriori (MAP) estimation techniques. The problem is to generate an artifact-free estimate f' of an original image f given a compressed image g. In MAP estimation approaches, the estimate f' is considered to be a random variable whose properties are modeled by a probability density, following the Bayesian viewpoint. The MAP estimate is the estimate f' that maximizes the posterior probability that is expressed in terms of a conditional probability and a prior probability. For transform-based coders-decoders (codecs), the conditional probability is modeled in the transform domain, while the prior probability is modeled in the spatial domain. This aspect significantly increases the computational complexity when the solution is obtained through iterative algorithms.

In addition to MAP techniques, there are other techniques that can be used to reduce artifacts, such as an algorithm known as Projection Onto Convex Sets (POCS). However, algorithms such as MAP and POCS suffer from the disadvantage of requiring the use of both the forward and the inverse transforms. Also, these algorithms are iterative in nature, so the forward and the inverse transforms are needed at each of several iterations of the algorithm. This aspect of existing algorithms increases their computational complexity significantly.

It would be desirable to reduce artifacts appearing in decoded compressed images while reducing the extensiveness and complexity of the required computational resources.

BRIEF SUMMARY OF THE INVENTION

In accordance with the present invention, a technique for post-processing decoded compressed images is disclosed that reduces decoding-related artifacts. A simplified version of the technique is non-iterative in nature, and provides good results without requiring extensive computational resources.

The technique employs a maximum likelihood estimation viewpoint on an estimate of an original image f. This estimate is regarded as a quantity with an unknown value. The image is modeled as a montage of "flat surfaces" of different intensities, where the number of flat surfaces and their respective intensities are generally different in different regions of the decoded image. The intensity of each pixel is conditionally adjusted to that of a corresponding flat surface in a window region surrounding the pixel. The adjustment of the pixels results in the reduction of certain types of noise in the vicinity of edges in the image, such as ringing and blocking artifacts.

In a general algorithm, the flat surface model is fitted to the observed image by estimating the model parameters. An algorithm known as the "k-means" algorithm is used in conjunction with a hierarchical clustering algorithm to achieve this fit. A cluster similarity measure (CSM) is used in the hierarchical clustering algorithm to determine the number of intensity clusters, and hence flat surfaces, that should be used to model a window region surrounding a pixel of interest. The pixel intensity is then adjusted to an estimated value which is the mean intensity of the cluster in which the pixel falls.

According to a simplified version of the above method, a three-cluster model is used in which the cluster centers are initialized by a deterministic rule. This simplified method performs a non-iterative mapping between the neighboring pixel values and the estimate, and is therefore particularly attractive for its good performance and simplicity. In one example, the disclosed methods are applied to remove ringing artifacts in images compressed by the JPEG2000 algorithm. The results show effective and efficient elimination of ringing artifacts with improved image quality.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description in conjunction with the Drawing, of which.

DETAILED DESCRIPTION OF THE INVENTION

As described above, the purpose of ringing artifact removal is to replace a rippled surface by a flat one. It is assumed that the original image f can be modeled as a montage of flat surfaces. In order to manage a broad class of images, a flat surface model is applied locally to small regions of the image. As disclosed herein, this region is a window of size [w×w] centered at the (i,j)th pixel. This window slides through a decoded image g pixel by pixel to pick samples G. While a square window is used herein, it will be appreciated that other window shapes can be used. The window size parameter w is chosen to achieve a desired compromise between accuracy (which increases with w) and computation time (which decreases with w). W can vary for different implementations of the algorithm as well as for different types of images.

A flat surface model consists of a number K of surfaces, a set of grayscale values $\theta$ for the respective surfaces, and the locations of the pixels included in each surface, referred to as "surface information" z. The set of grayscale values $\theta$ is a [K×1] vector. The surface information z is a [w×w] matrix with its elements taking the values in $\{1, \ldots, K\}$. The flat surface model image for a window of size [w×w] can be written as:

$$F = \sum_{k=1}^{K} \theta_k 1_{z=k}$$

where 1 is a vector-valued indicator function. The computation of the flat-surface-model window image F from the above equation requires an estimate of z and $\theta$. After the image F is obtained, the center pixel of F, denoted $F_c$, is taken as the (i,j)th pixel of the estimate of the entire image f, denoted herein as f'.

Figure 1:
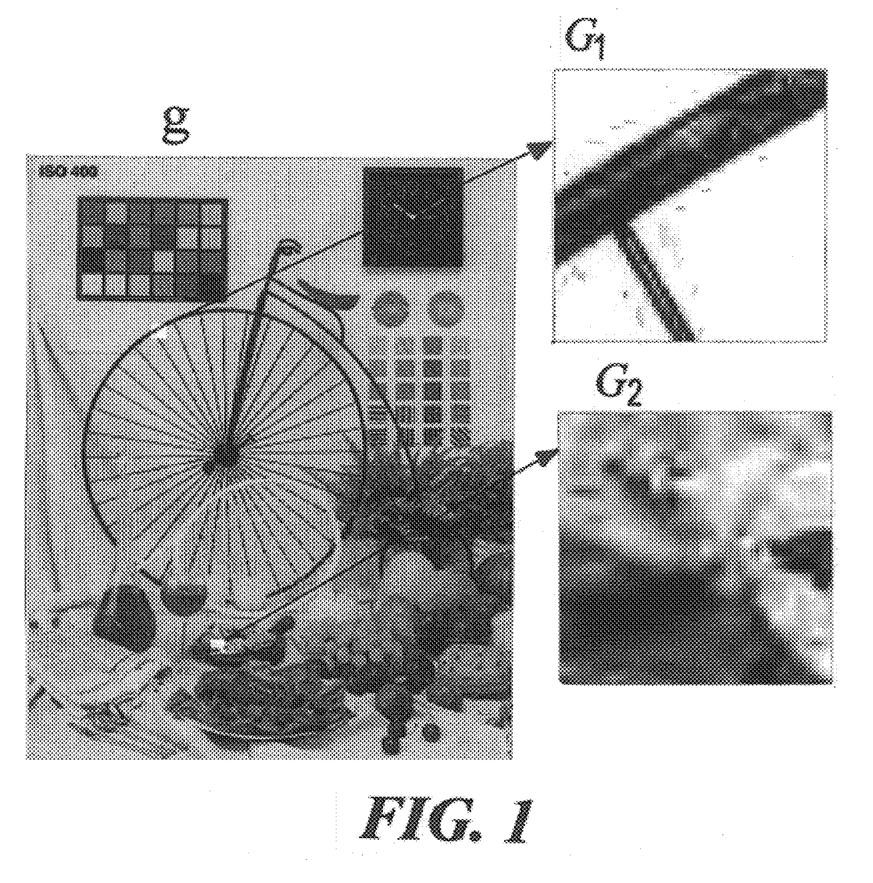
FIG. 1 is a set of images including a main decoded image and two enlarged window regions thereof.

FIG. 1 shows an example decoded image g and two window regions $G_1$ and $G_2$ used to illustrate the creation of the flat surface model. The window region $G_1$ can be described by a fairly simple model in which the number of surfaces K is equal to 2. For reasons that are clearer after consideration of an example presented below, the vector $\theta$ of surface intensities might be [73.8, 174.3]. The surface information z is a matrix whose elements indicate which flat surface the corresponding pixel belongs to. The following is a coarse representation of the general structure of the matrix z, which in general can have as many elements as the number of pixels in the window. It will be appreciated that the "1"s in the matrix correspond to the darker areas of region $G_1$ and the "2"s correspond to the lighter areas:

[2 2 2 2 2 2 1 1]
[2 2 2 2 2 1 1 2]
[2 2 2 1 1 2 2 2]
[2 1 1 2 2 2 2 2]
[1 1 2 1 2 2 2 2]
[2 2 2 2 1 2 2 2]

The region $G_2$ requires a more complicated model, in order to capture the extensive texturing. One satisfactory model uses 8 surfaces (K=8), and a vector $\theta$ of 8 surface intensities varying from dark to light (see example below). The surface numbers are distributed in the surface information matrix z in a more random-appearing fashion than for region $G_1$, reflecting the more richly textured appearance of region $G_2$. This matrix is omitted from this description for the sake of simplicity.

Figure 2:
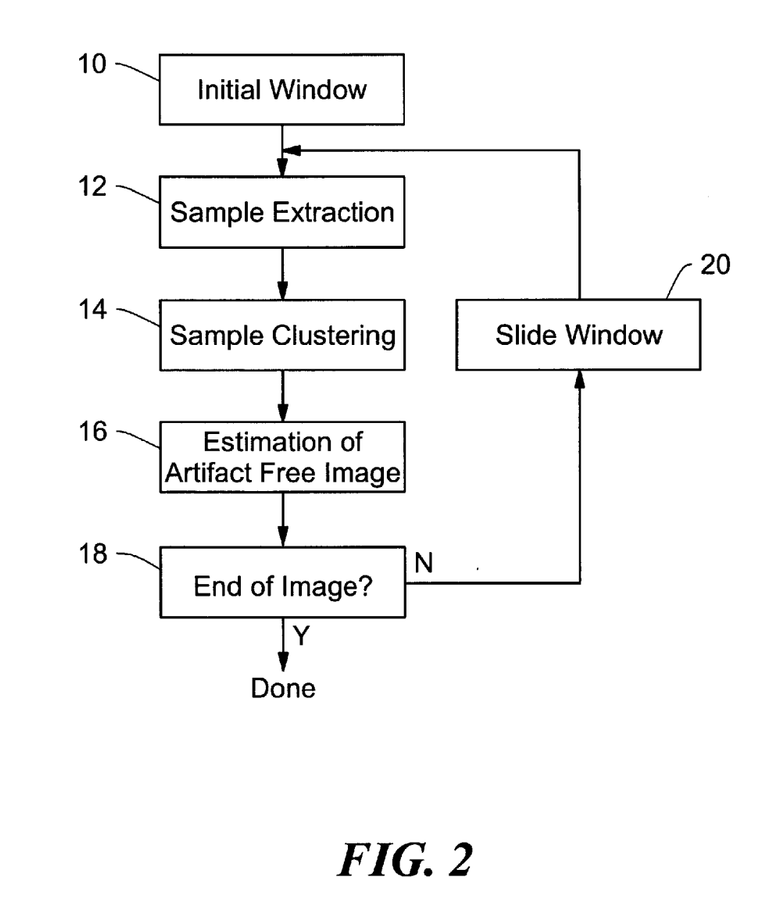
FIG. 2 is a flow diagram showing the high-level operation of the image artifact reduction process using hierarchical clustering in accordance with one aspect of the present invention.

FIG. 2 shows the general structure of the maximum likelihood estimation algorithm. An initial [w×w] window is defined at step 10. For example, it may be convenient to start at the upper left corner of the image and scan rightward and downward in a raster fashion. At step 12, the set of $w^2$ samples G are extracted. At step 14, these samples are clustered in a manner described below. At step 16, the clusters and the value of the center pixel in G are used to generate an estimate for the corresponding pixel in the artifact-free image f'. Steps 18 and 20 cause the process to be repeated for all the pixels of the decoded image g.

The samples G taken from the decoded image are regarded as incomplete data, with the cluster information z missing. The problem of estimating the parameter $\theta$ from the complete data (G,z) is considered. The maximum likelihood estimation of the model parameter $\theta$ can be written as:

$$\hat{\theta} = \arg\max_{\theta} P[G | \theta]$$

By adding the missing data to the problem, it becomes:

$$\hat{\theta} = \arg\max_{\theta} P[G, z | \theta]$$

One way to solve the problem with the missing data is to use an algorithm known as the expectation maximization (EM) algorithm. In an approximation of the EM algorithm known as the k-means algorithm, the soft decision of the EM algorithm is replaced by a hard decision. The k-means algorithm has the advantage of simplicity while serving as a good approximation of the EM algorithm. The approximation of the EM steps in the k-means algorithm are as follows:

E-Step: $\hat{z}^{k+1} = \arg\max_{z} \log P[G, z | \hat{\theta}^k]$

Figure 5:
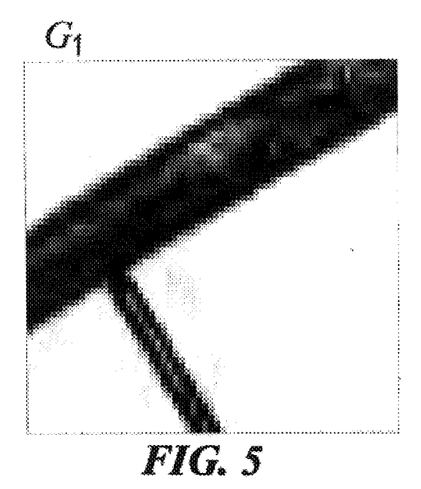
FIGS. 5 and 6 are enlarged versions of the two window region images, respectively, of FIG. 1.

M-Step: $\hat{\theta}^{k+1} = \arg\max_{\theta} \log P[G, \hat{z}^{k+1} | \theta]$ The k-means algorithm is a clustering algorithm that does not require exact knowledge of the shape of the probability density $P[G|\theta]$. When the number of clusters is K, the probability $P[G|\theta]$ is modeled by a mixture of K distributions, not necessarily Gaussian, whose peaks are at $[\theta_1, \theta_2, \ldots, \theta_K]$ Removal of ringing artifacts depends on the order K of the flat surface model. For example, FIG. 5 below shows degradation by ringing artifacts of a region of an image. In order to restore an image free of ringing artifacts, the number of surfaces K in the flat surface model for the region should be chosen as K=2. As the window slides through the image g to pick up the samples G, the statistics of the samples G may change. Hence, the optimal number of surfaces in the model may also change, so therefore it is generally necessary to determine the order K of the model from the samples G.

The process of finding the optimal number of clusters or surfaces is referred to as "cluster validation", and may be done in one of two general ways. Hierarchical clustering methods produce nested partitions of one to $K_{max}$, and determine the optimal number of clusters K using a criterion of merit. In partitional clustering methods, the number of clusters is simply an input from a user, reflecting a considered compromise between effective artifact reduction and computational complexity.

The general algorithm shown in FIG. 1 uses hierarchical clustering. The sample clustering at step 14 involves first estimating the number of clusters that should be used, and then clustering the samples accordingly. The estimation of the number of clusters to use is equivalent to determining the parameter K for the flat surface model.

Figure 3:
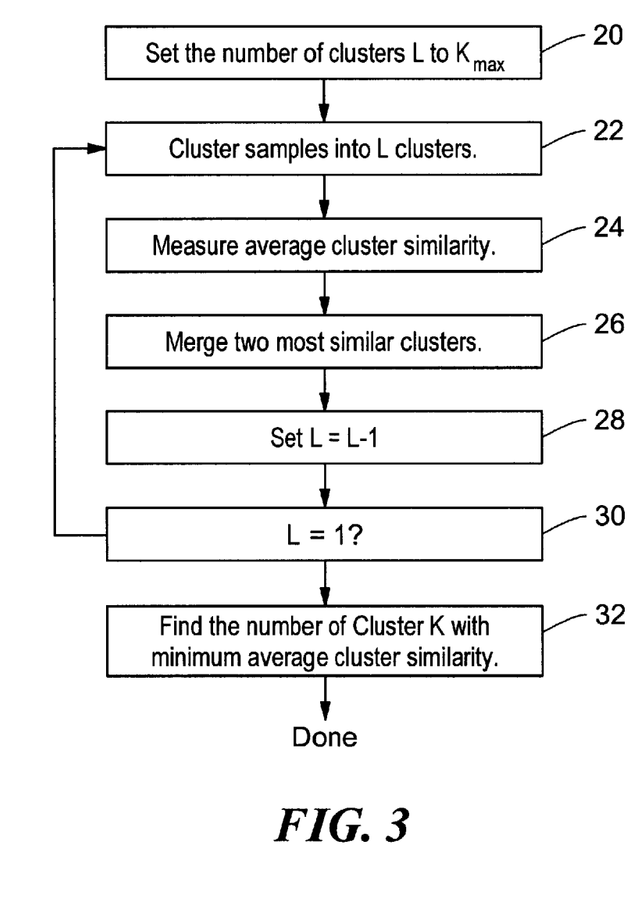
FIG. 3 is a flow diagram showing the hierarchical clustering operation of the algorithm of the process of FIG. 2.

Referring to FIG. 3, this estimation begins at step 20 by setting a variable L to a value $K_{max}$, which represents the maximum number of surfaces that can be used to model any window region. $K_{max}$ is a general parameter for the algorithm. Larger values of $K_{max}$ tend to yield greater accuracy, at the cost of complexity and computational resources. For purposes of the present description, $K_{max}$ is assumed to be 10.

At step 22, the samples G are clustered into L clusters. This can be accomplished using the k-means algorithm referred to above. The k-means algorithm takes an initial clustering of the samples, calculates a mean and a variance for each cluster, re-groups the samples into new clusters in a manner tending to reduce the sum of the variances of all clusters, and repeats this process until the total variance converges to a minimum value. Once this point is reached, a mean $\theta_k$ and a variance $\sigma^2_k$ for each of the L clusters is known.

At step 24, the average "similarity" of each cluster to all the other clusters is measured. For this measurement, a criterion of merit known as the "cluster similarity measure" (CSM) is used, which is defined as:

$$R_{k,l} = \frac{\sigma_k + \sigma_l}{|\theta_k - \theta_l|}$$

Intuitively speaking, CSM measures how close two clusters are to each other. Cluster pairs whose means are similar have a high CSM, as do cluster pairs that are more spread out as indicated by relatively high variances. CSM is suitable for ringing artifact removal because it uses the distance between the clusters.

Images that are substantially free of ringing artifacts are obtained by prohibiting surfaces with similar grayscales. Hence, surfaces with similar intensities are prevented. This is achieved by modifying the CSM to the following:

$$R_{k,l} = \frac{\sigma_k + \sigma_l}{\rho(\theta_k - \theta_l)}$$

The function pp is given by:

$$\rho(x) = \begin{cases} c, & \text{if } |x| \leq \alpha \\ |x|, & \text{otherwise} \end{cases}$$

where $\alpha$ is a positive parameter and c is a small positive constant less than $\alpha$. The use of the function $\rho$ forces clusters whose centers are separated by less than $\alpha$ to be treated as equally similar to each other. With c being a small number, it is less likely that the number L of an iteration yielding closely-spaced clusters close is chosen as the order K of the flat surface model.

The average cluster similarity CSM(L) is calculated in step 24 according to the following:

$$CSM(L) = \frac{1}{L} \sum_{k=1}^{L} \max_{l \in \{1,\ldots,K_{max}\}; l \neq k} R_{k,l}$$

The value of CSM(L) is saved for use in a later process step as described below.

At step 26, the two most similar clusters as determined by the CSM values are merged, meaning that they are replaced by a single cluster including all the samples from both. As a result, of course, the number of clusters has been reduced by one. At step 28, the variable L is decremented, and at step 30 it is compared with 1. If L has not reached 1, steps 22–26 are then repeated for the new set of clusters.

After the above process has been repeated to the point that the initial $K_{max}$ clusters have been merged into two clusters, the test at step 30 succeeds and the process proceeds to step 32. At this point, the average similarity measures CSM(L) for each of the $K_{max}$ sets of clusters are compared. The number of clusters in the set having the smallest average cluster similarity is chosen as the number K of clusters (and hence surfaces) to be used in subsequent clustering and estimating by the algorithm.

Once the number of clusters K has been selected, the samples are then clustered into K clusters using the k-means algorithm. It should be noted that this clustering is similar to but generally different from the clustering obtained during the ($K_{max}$-K+1)th iteration of the process of FIG. 3, because in this case there is no prior merging of similar clusters.

Once the K clusters have been created, the actual intensity value $G_c$ of the center pixel of the window is used to create an estimated intensity value for the corresponding pixel in the estimated image f'. It is first determined which of the K clusters the intensity of the center pixel $G_c$ belongs to. The intensity of the corresponding pixel in the estimated image f' is set equal to the mean ($\theta$) of that cluster.

Certain limitations of the CSM measure should be taken into consideration. For example, CSM requires at least two clusters. In some cases, it is useful to have a one-cluster model as an option. Such a model is useful in areas of the image having uniform intensity, such as areas of the region $G_1$ away from the dark wheel spoke. To make such a model available, a decision step can be added to the algorithm of FIG. 3. If the minimum average CSM occurs for K=2 and the distance between the centers of two clusters is less than a, the two clusters are merged to become one cluster.

Another limitation of CSM is that it requires at least one sample in each cluster. Clusters having less than one sample are prevented by applying an arbitrary large variance to them. Also, there can be cases when all the samples in a cluster have the same grayscale values, resulting in a variance of zero. The CSM of two clusters both having zero variances cannot be calculated. To avoid this case, the variances of such clusters are set to one.

It will be apparent that the above algorithm requires significant processing capacity, partly due to its use of the hierarchical clustering method to estimate the number of clusters. An effective simplification is to use partitional clustering, referred to above. In particular, a three-cluster model with the cluster centers determined by a simple rule has been found to yield very good results. Given the samples G, the cluster centers are initialized as:

$$\theta = \begin{bmatrix} G_c - 2\alpha \\ G_c \\ G_c + 2\alpha \end{bmatrix}$$

where $G_c$ denotes the grayscale value of the center pixel in the window. Using this initial clustering, one iteration of the k-means algorithm is performed. The estimate of the pixel in f' is then taken to be the mean $\theta$ of the cluster in which the center pixel intensity value $G_c$ falls.

This estimate is still a maximum likelihood estimate under the probability density $P[G|\theta]$ approximated by the abbreviated k-means algorithm. Because the center pixel of the window $F_c$ is taken as the (i,j)th pixel of the ringing artifact free image f', the $\theta$ value taken by $F_c$ is the only parameter of interest. Furthermore, with the abbreviated k-means algorithm, the result of the three cluster model is non-iterative in nature. This simplified algorithm is robust in the sense that it preserves major edges, because of its clustering of the samples and use of only the samples in one cluster.

The operation of this "robust filter" can be written explicitly. Let C(i,j) denote the index set of pixels in G centered at the (i,j)th pixel, and define an index set A(i,j;α) such that:

$$A(i,j;\alpha) = \{(p,q)|(p,q) \in C(i,j), |g_{p,q} - g_{i,j}| \leq \alpha\}$$

Then, for the entire image, the robust filter can be written as follows:

$$\hat{f} = \arg\min \sum_{i,j} \sum_{m,n \in C(i,j)} (g_{m,n} - f_{i,j})^2 1_{m,n \in A(i,j;\alpha)}$$

where 1 is the indicator function, and the summation with respect to (i,j) is over the entire image. Denote the function $V_c$ by:

$$V_c(g;f) = \sum_{i,j} \sum_{m,n \in C(i,j)} (g_{m,n} - f_{i,j})^2 1_{m,n \in A(i,j;\alpha)}$$

Then f is regarded as a parameter of the function $V_c$, and the notation $V_c(g;f)$ is adopted instead of $V_c(g,f)$. The robust filter is equivalent to the maximum-likelihood estimation of the image with the probability $P[g|f]\$$ modeled by the potential function $V_c(g;f)$ such that:

$$P[g|f] \alpha \exp\{-V_c(g;f)\}$$

The estimate is:

$$f' = f^\alpha$$

where $f^\alpha$ is the conditional mean defined by:

$$\overline{f}_{i,j}^\alpha = \frac{\sum_{p,g \in A(i,j;\alpha)} g_{p,q}}{\#_{A(i,j;\alpha)}}$$

in which $\#_{A(i,j;\alpha)}$ is the number of pixels in the set A(i,j;α) The estimate is simply a conditional mean of neighboring pixels. Its computational complexity is far less than the above algorithm using hierarchical clustering, or algorithms based on MAP estimation or POCS.

Figure 4:
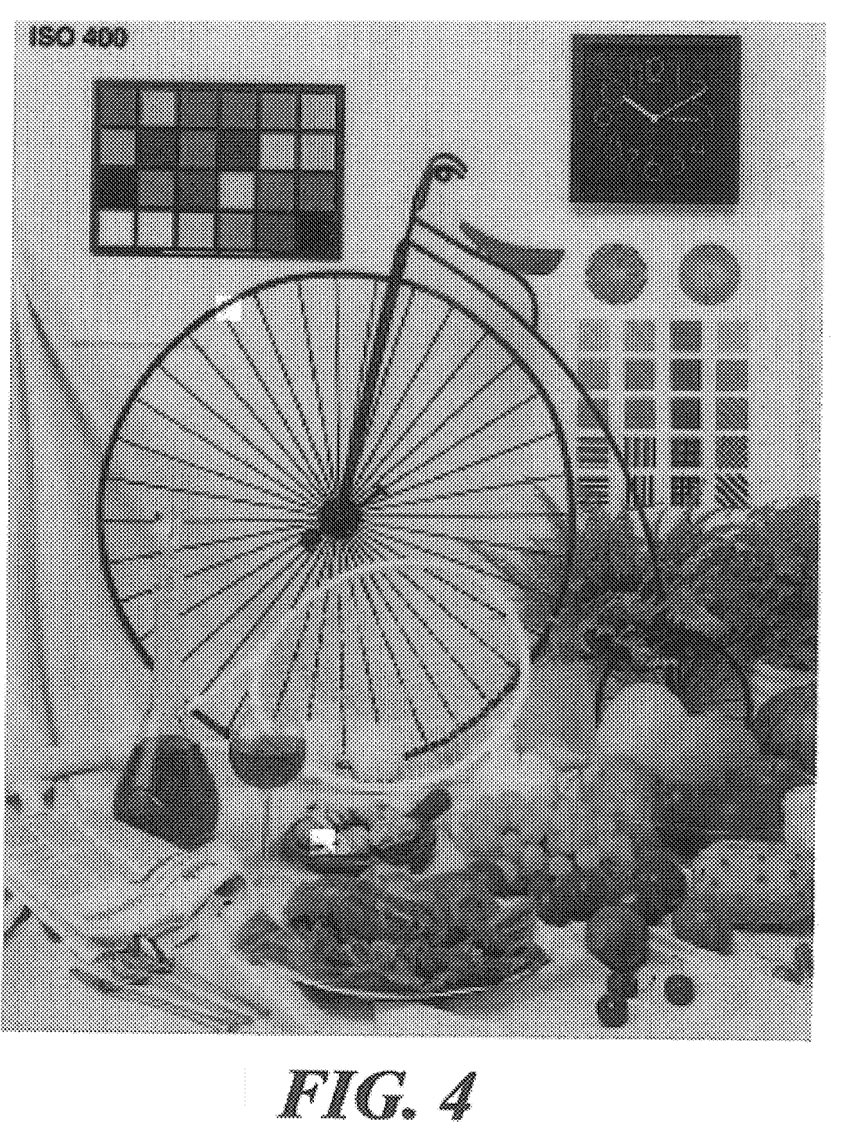
FIG. 4 is an enlarged version of the main decoded image of FIG. 1.

An example is presented to illustrate the operation of the above algorithms and to show their effectiveness. The example uses the images of FIG. 1, enlarged versions of which appear in FIGS. 4–6. Referring to FIG. 4, the region $G_1$ is a part of a bike appearing in the larger image of FIG. 4, which has been compressed by JPEG2000 at 0.125 bit per pixel (bpp). The region $G_1$ shows visible oscillation or ringing artifacts near edges in the image, the artifacts appearing as light gray blotches.

Figure 7:
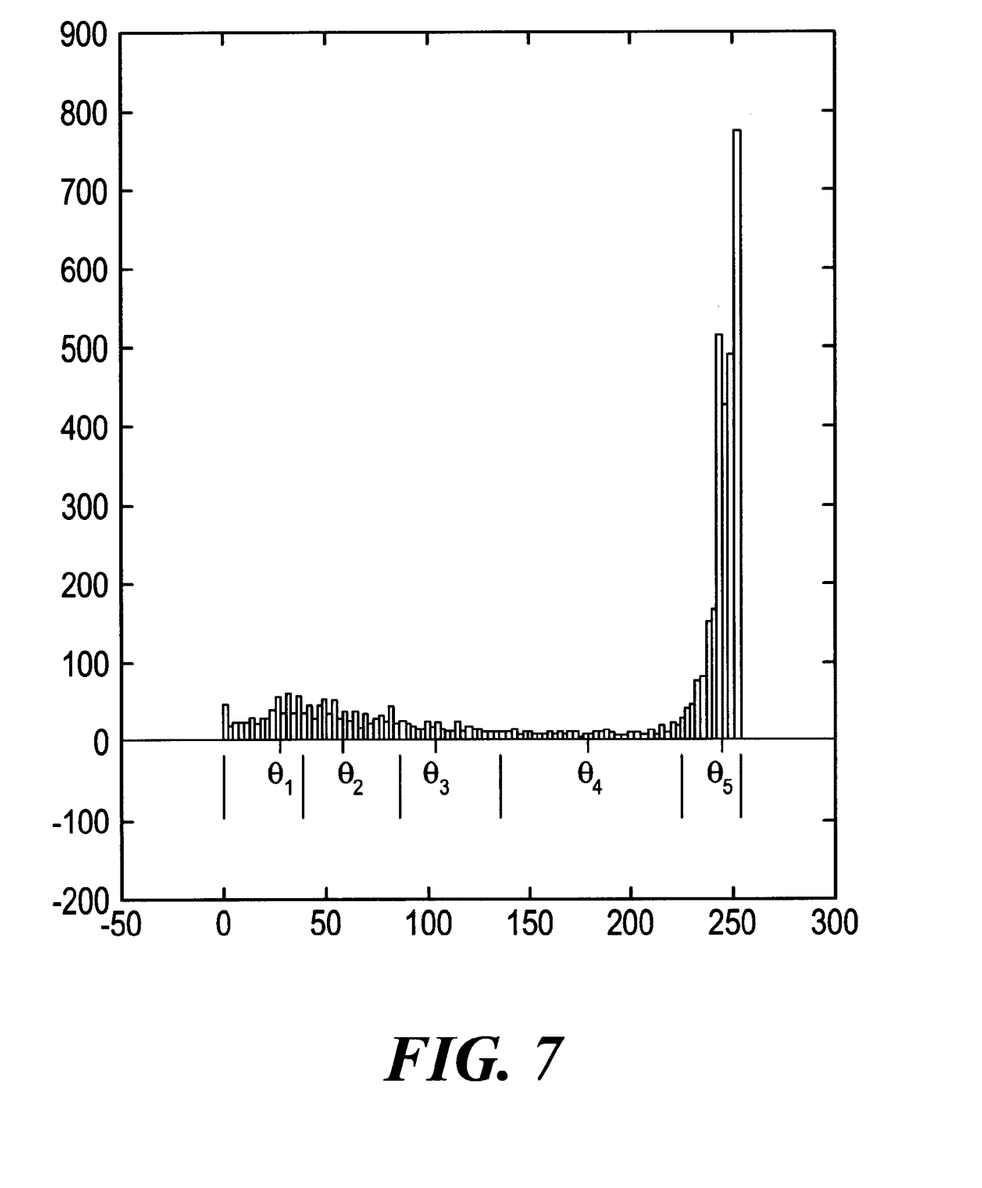
FIGS. 7 through 9 are plots showing three different clusterings for a pixel intensity histogram of the window region of FIG. 5 as generated during the hierarchical clustering algorithm of FIG. 2.
Figure 8:
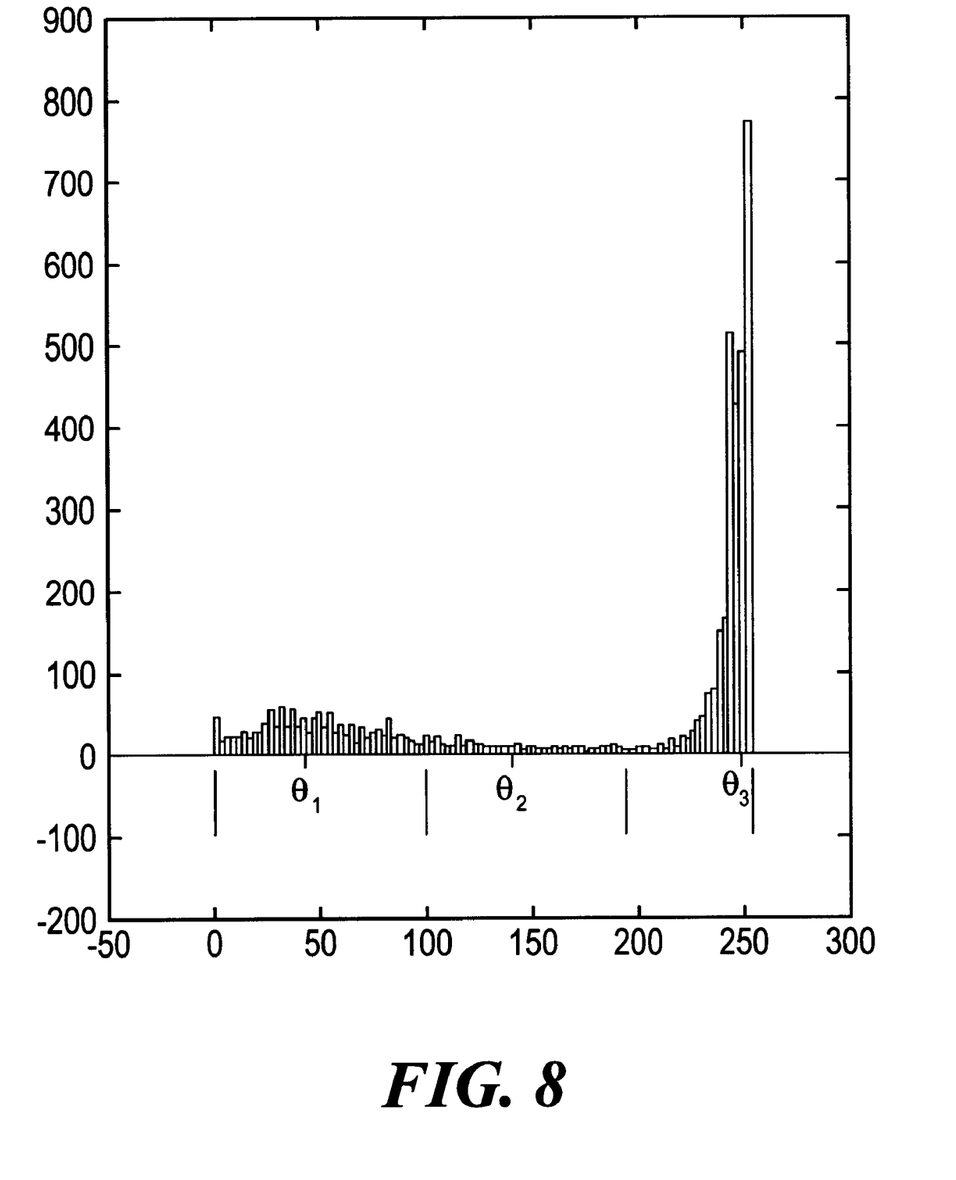
Figure 9:
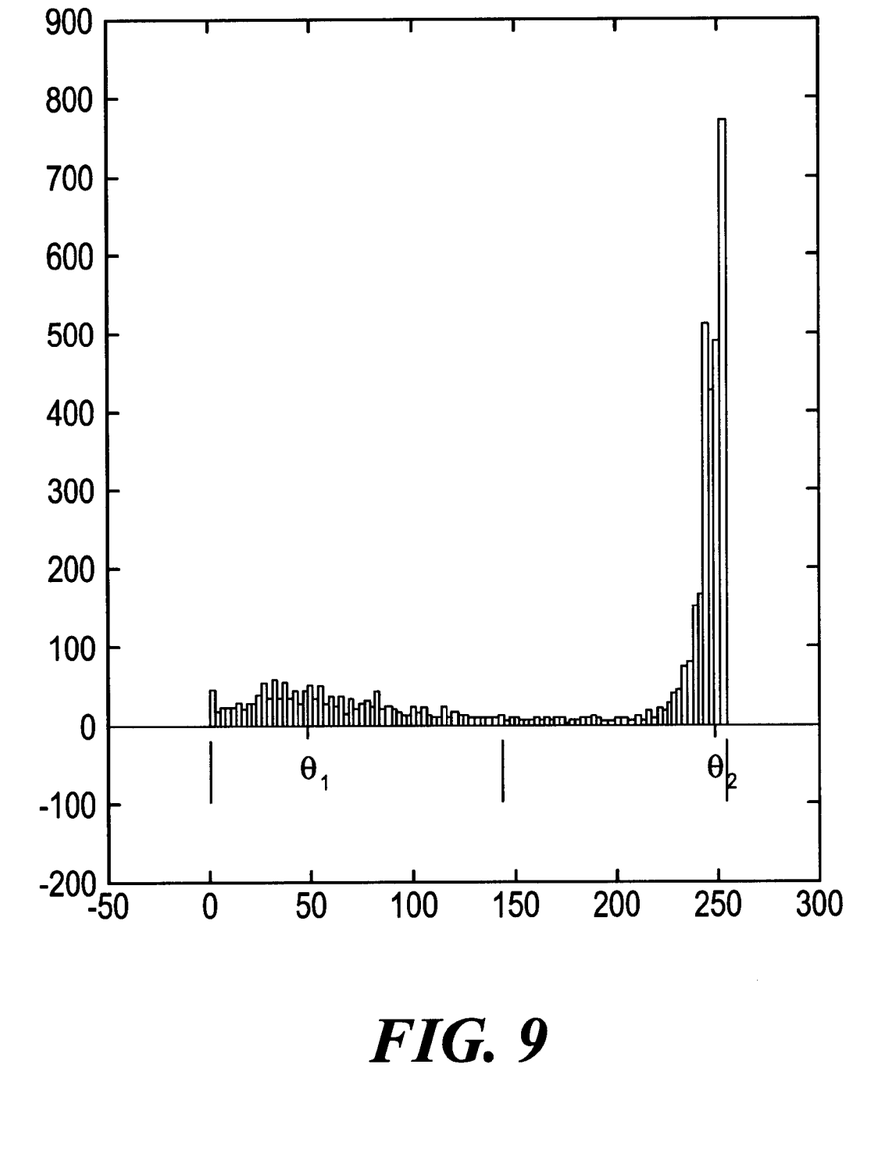

The hierarchical algorithm is initialized with $K_{max}=10$. It finds the cluster centers θ with a model using L=10 clusters, and measures the average CSM. The two clusters which are most similar to each others are merged, and the algorithm continues iteratively with successively smaller values of L until L=1. FIGS. 7–9 show the histogram for the window $G_1$ with the cluster boundaries and means identified for three of the iterations: L=5, L=3, and L=2. The table below shows the average CSM for the model at each iteration.

| L | CSM |
|---|---|
| 10 | infinity |
| 9 | 1.07 |
| 8 | 0.95 |
| 7 | 0.82 |
| 6 | 0.71 |
| 5 | 0.42 |
| 4 | 0.39 |
| 3 | 0.49 |
| 2 | 0.27 |

Note that for the case of L=10, there are clusters whose centers are separated by less than α. With c chosen as a very small number, the average CSM tends to infinity.

From the above table, the minimum of the average CSM for the region $G_1$ occurs for L=2. Thus, the hierarchical clustering algorithm picks the two-cluster model for this window. The intensity of the center pixel falls in the cluster whose mean is $\theta_2$ in the clustering of FIG. 9, and thus this $\theta_2$ is used as the estimate of the corresponding pixel in f'.

The clustering shown in FIG. 8 for L=3 very roughly approximates the clustering that occurs when the robust filter algorithm is used, in which K=3. Thus, for the robust filter algorithm, the center pixel of the window $G_1$ falls in a cluster whose mean is nearly (if not exactly) equal to $\theta_3$. Thus the corresponding pixel in f' is estimated as this $\theta_3$. This $\theta_3$ is very equal to the mean $\theta_2$ (FIG. 8) of the two-cluster model used by the hierarchical clustering algorithm. Thus it will be appreciated that for the window $G_1$ the three-cluster model yields substantially the same result as the two-cluster model.

Figure 6:
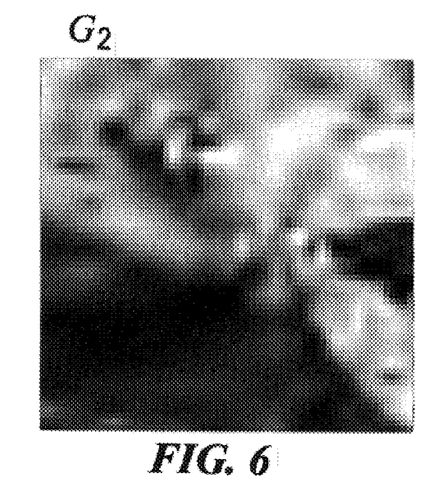
Figure 10:
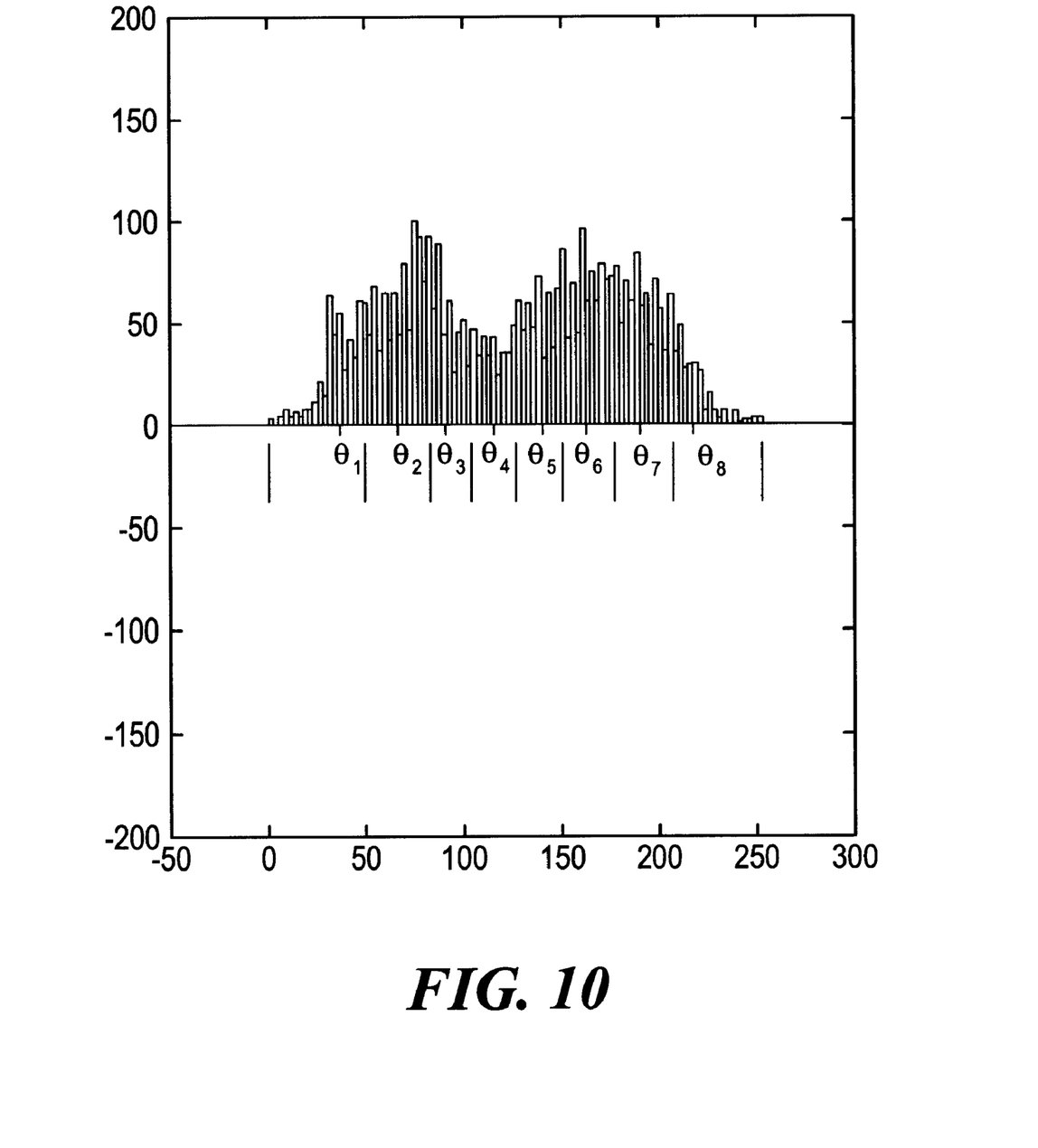
FIGS. 10 through 12 are plots showing three different clusterings for a pixel intensity histogram of the window region of FIG. 6 as generated during the hierarchical clustering algorithm of FIG. 2.
Figure 11:
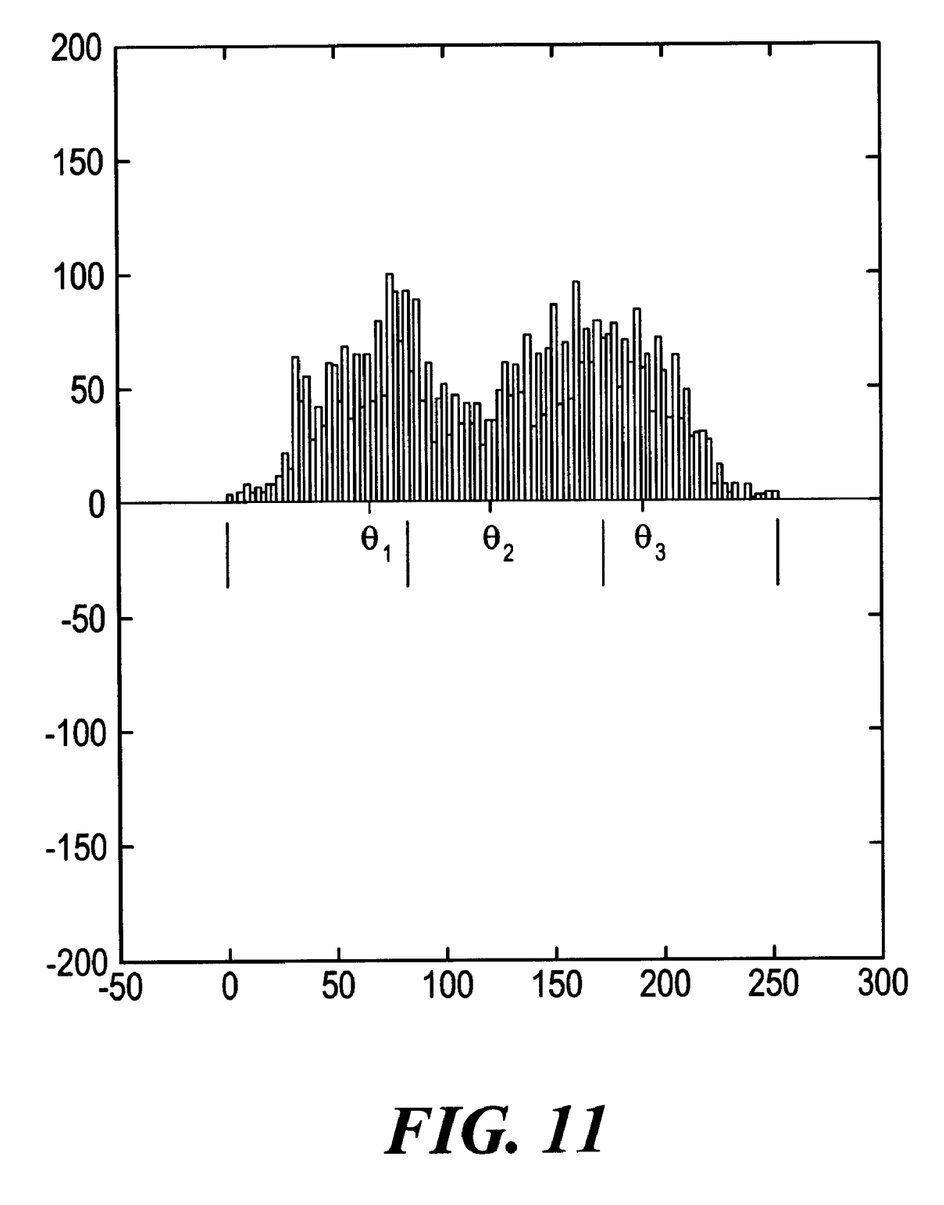
Figure 12:
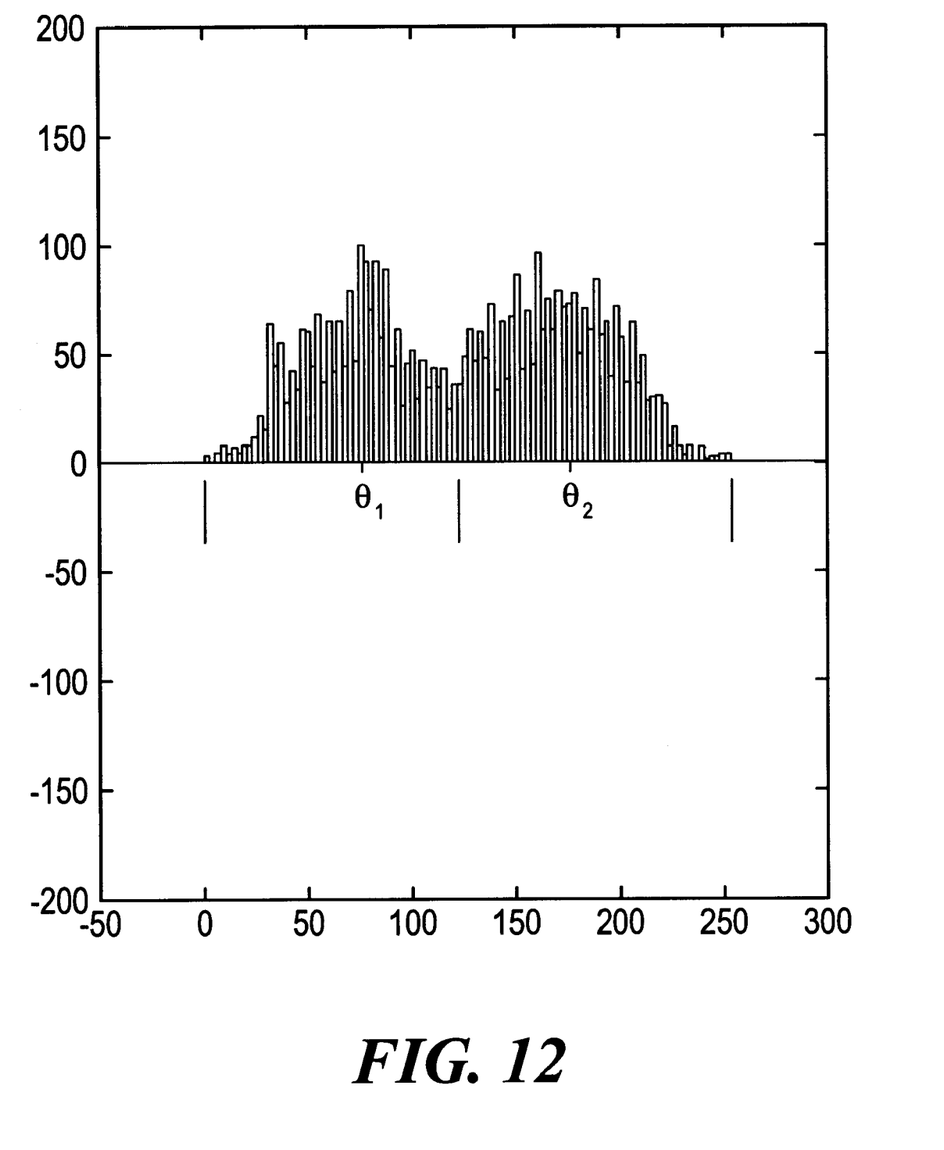

FIG. 6 shows the window region $G_2$, which contains texture. The ringing artifacts in this part of the image, if any, are not objectionable because they are masked by the texture. This part of image should be modeled with a sufficiently large number of clusters such that texture is preserved. FIGS. 10–12 show the histogram with the superimposed cluster boundaries and centers for the cases L=8, L=3, and L=2. The table below shows the average CSM values.

| L | CSM |
|---|---|
| 10 | infinity |
| 9 | 0.62 |
| 8 | 0.45 |
| 7 | 0.53 |
| 6 | 0.83 |
| 5 | 0.46 |
| 4 | 0.48 |
| 3 | 0.62 |
| 2 | 0.54 |

The minimum of the average CSM occurs at L=8. Hence the order of the flat surface model K for this region $G_2$ is chosen as eight. The pixel in the image f' is estimated as the mean of the cluster into which the pixel $G_2$ falls.

Methods for image artifact reduction using maximum likelihood parameter estimation have been shown. It will be apparent to those skilled in the art that modifications to and variations of the above-described techniques are possible without departing from the inventive concepts disclosed herein. Accordingly, the invention should be viewed as encompassing the entire scope and spirit of the appended claims below.

What is claimed is:

1. A method for processing digital images to remove non original artifacts comprising the steps of:
    defining a two dimensional window of a predetermined number of pixels in a digital image, said window having a target pixel therein, said window being smaller than said image;
    grouping the window of pixels into a plurality of clusters of pixels, each cluster spanning a unique intensity range;
    setting the intensity for the target pixel to a value within the cluster containing that target pixel.

2. The method of claim 1 further including the step moving said window to provide a different target pixel and of repeating the steps thereof.

3. The method of repeating the steps of claim 2 over said image.

4. The method of claim 1 wherein said clustering step includes the step of setting an initial number for said plurality of clusters and determining a mean value for the pixels in each cluster.

5. The method of claim 4 further including the steps of determining the closeness of the cluster's mean intensities and of reducing the number of clusters from said plurality by combining clusters with the smallest mean difference.

6. The method of claim 5 wherein said reducing step includes the step of determining the cluster mean for each of the clusters in the reduced number of clusters.

7. The method of claim 6 further including the step of setting the number of clusters to a number for which the average cluster similarity is a minimum.

8. The method of claim 1 wherein said minimum average similarity is determined.

9. The method of claim 1, further including the steps of determining the closeness of the cluster's mean intensities and of reducing the number of clusters from said plurality by combining clusters with the smallest mean difference.

10. The method of claim 9 wherein said reducing step includes the step of determining the cluster mean for each of the clusters in the reduced number of clusters.

11. The method of claim 10 further including the step of setting the number of clusters to a number for which the average cluster similarity is a minimum.

12. The method of claim 11 wherein said minimum average similarity is determined.

13. The method of claim 1 wherein said plurality of clusters is predetermined to be no more than 3 and no less than 2.

14. The method of claim 13 wherein said plurality of clusters is reduced to one.

15. The method of claim 1 wherein said target pixel is set to the value of the mean of said cluster containing said target pixel.

16. A method for processing digital images to remove non original artifacts comprising the steps of:
    defining a two dimensional window of a predetermined number of pixels in a digital image, said window having a target pixel therein, said window being smaller than said image;
    grouping the window of pixels into three clusters, a first cluster containing said target pixel and two additional clusters having pixels whose intensities differ from a mean of said first cluster by greater than a predetermined value, ca, c=1 or 2;
    setting the intensity for the target pixel to a value within the cluster containing that target pixel.

17. The method of claim 16 wherein said target pixel is set to the value of the mean of said first cluster.

18. The method of claim 16 further including the step of providing said digital image from a compressed image source.

19. The method of claim 18 further including the step of providing said digital image as a decompressed image.

20. The method of claim 18 wherein said window has a size which is a function of the degree of compression.

21. The method of claim 18 wherein said compression step provides in said digital image an indication of a one or more of an $\alpha$ and a window size.

22. The method of claim 21 wherein $\alpha$ is a function of a degree of compression.

23. A method for reducing edge aberrations in a digital image of plural pixels comprising the steps of:
    transforming data in an array of a plurality of N pixels of said digital image into intensity space;
    clustering pixels in said array in intensity space according to an algorithm to a number M of clusters much less than N, one of which includes a target of one or more pixels;
    setting the intensity of said target to an intensity which is a function of the intensity cluster containing that target.

24. The method of claim 23 wherein said intensity setting step includes the step of determining cluster mean intensity.

25. Apparatus for processing digital images to remove non original artifacts comprising:
    means for defining a two dimensional window of a predetermined number of pixels in a digital image, said window having a target pixel therein, said window being smaller than said image;
    means for grouping the window of pixels into a plurality of clusters of pixels, each cluster spanning a unique intensity range;
    means for setting the intensity for the target pixel to a value within the cluster containing that target pixel.

26. The apparatus of claim 25 further including means for moving said window to provide a different target pixel and of repeating the steps thereof.

27. The apparatus of claim 25 for setting the intensity of target pixels for the other pixels of said digital image.

28. The apparatus of claim 25 wherein said clustering means includes means for setting an initial number for said plurality of clusters and determining a mean value for the pixels in each cluster.

29. The apparatus of claim 28 further including means for determining the closeness of the cluster's mean intensities and of reducing the number of clusters from said plurality by combining clusters with the smallest mean difference.

30. The apparatus of claim 29 wherein said reducing means includes means for determining the cluster mean for each of the clusters in the reduced number of clusters.

31. The apparatus of claim 29 further including means for setting the number of clusters to a number for which the average cluster similarity is a minimum.

32. The apparatus of claim 31 wherein said minimum average similarity is determined.

33. The apparatus of claim 25 further including means for determining the closeness of the cluster's mean intensities and for reducing the number of clusters from said plurality by combining clusters with the smallest mean difference.

34. The apparatus of claim 33 wherein said reducing means includes means for determining the cluster mean for each of the clusters in the reduced number of clusters.

35. The apparatus of claim 34 further including means for setting the number of clusters to a number for which the average cluster similarity is a minimum.

36. The apparatus of claim 35 wherein said minimum average similarity is determined.

37. The apparatus of claim 25 wherein said plurality of clusters is predetermined to be no more than 3 and no less than 2.

38. The apparatus of claim 37 wherein said plurality of clusters is reduced to one.

39. The apparatus of claim 25 wherein said target pixel is set to the value of the mean of said cluster containing said target pixel.

40. A apparatus for processing digital images to remove non original artifacts comprising:

means for defining a two dimensional window of a predetermined number of pixels in a digital image, said window having a target pixel therein, said window being smaller than said image;

means for grouping the window of pixels into three clusters, a first cluster containing said target pixel and two addition clusters having pixels whose intensity differs from a mean of said first cluster by greater that a predetermined value, $c\alpha$, c=1 or 2;

means for setting the intensity for the target pixel to a value within the cluster containing that target pixel.

41. Apparatus of claim 40 wherein said target pixel is set to the value of the mean of said first cluster.

42. The apparatus of claim 40 further including means for providing said digital image from a compressed image source.

43. The apparatus of claim 42 further including means for providing said digital image as a decompressed image.

44. The apparatus of claim 42 wherein $\alpha$ is a function of a degree of compression.

45. The apparatus of claim 42 wherein said window has a size which is a function of the degree of compression.

46. The apparatus of claim 42 wherein said compression means provides in said digital image an indication of an one or more of an $\alpha$ and a window size.

47. Apparatus for reducing edge aberrations in a digital image of plural pixels comprising:

means for transforming data in an array of a plurality of N pixels of said digital image into intensity space;

means for clustering pixels in said array in intensity space according to an algorithm to a number M of clusters much less than N, one of which includes a target of one or more pixels;

means for setting the intensity of said target to an intensity which is a function of the intensity cluster containing that target.

* * * * *

UNITED STATES PATENT AND TRADEMARK OFFICE
CERTIFICATE OF CORRECTION

PATENT NO. : 6,304,678 B1  
DATED : October 16, 2001  
INVENTOR(S) : Seungjoon Yang et al.

It is certified that error appears in the above-identified patent and that said Letters Patent is hereby corrected as shown below:

Column 6,  
Line 5, "pp" should read -- $\rho$ --;  
Line 65, "a," should read -- $\alpha$, --;

Column 8,  
Line 5, delete the following equation:

$$ \overline{f}_{i,j}^{\alpha} = \frac{\sum_{p,g \in A(i,j:\alpha)} g_{p,q}}{\#_{A(i,j:\alpha)}} $$

Line 5, insert the following equation:

$$ -- \overline{f}_{i,j}^{\alpha} = \frac{\sum_{p,q \in A(i,j;\alpha)} g_{p,q}}{\# A(i,j;\alpha)} -- $$

Column 10,  
Line 24, "ca," should read -- $c\alpha$, --.

Signed and Sealed this

Nineteenth Day of November, 2002

Attest:

JAMES E. ROGAN  
*Attesting Officer*  *Director of the United States Patent and Trademark Office*